US012645758B2

(12) United States Patent
Ishitani et al.

(10) Patent No.: US 12,645,758 B2
(45) Date of Patent: Jun. 2, 2026

(54) LEARNING CONTROL DEVICE, LEARNING CONTROL METHOD, AND COMPUTER PROGRAM PRODUCT

(71) Applicant: KABUSHIKI KAISHA TOSHIBA, Tokyo (JP)

(72) Inventors: Makihiko Ishitani, Kawasaki (JP); Shinji Takakura, Yokohama (JP); Yoshiyuki Ishihara, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 874 days.

(21) Appl. No.: 17/897,409

(22) Filed: Aug. 29, 2022

(65) Prior Publication Data

US 2023/0195844 A1 Jun. 22, 2023

(30) Foreign Application Priority Data

Dec. 20, 2021 (JP) ................................. 2021-205941

(51) Int. Cl.
G06F 18/21 (2023.01)
G06F 17/15 (2006.01)
(52) U.S. Cl.
CPC ............ *G06F 18/217* (2023.01); *G06F 17/15* (2013.01)
(58) Field of Classification Search
None
See application file for complete search history.

(56) References Cited

U.S. PATENT DOCUMENTS 5,157,742 A 10/1992 Niihara
5,907,450 A 5/1999 Ishikawa
(Continued)

FOREIGN PATENT DOCUMENTS

EP 0 501 456 A3 9/1992
JP 03-252287 A 11/1991
(Continued)

OTHER PUBLICATIONS

Ishikawa et al., "A Stability Analysis on a Learning Control for Hard Disk Drives", No. 97-1 Japan Society of Mechanical Engineers 74th ordinary session of the Diet lecture lecture memoirs (IV), 1997, 5 pages (with English Machine Translation).
(Continued)

*Primary Examiner* — Mark D Featherstone
(74) *Attorney, Agent, or Firm* — Oblon, McClelland, Maier & Neustadt, L.L.P.

(57) ABSTRACT
A learning control device according to one embodiment includes one or more hardware processors. The hardware processors function as an update unit, a calculation unit, and a correction unit. The update unit serves to update a modified control input in accordance with a tracking error. The modified control input is used during a learning trial. The calculation unit serves to calculate a lag in a learning control start time in accordance with a state of a control target at a start of the learning control. The learning control start time is a time at which learning control starts. The correction unit serves to correct the modified control input having been updated by the update unit. The modified control input is corrected by using the lag to have a value obtained by offsetting the lag.

5 Claims, 10 Drawing Sheets

(56)     References Cited

U.S. PATENT DOCUMENTS

| | | | | |
|---|---|---|---|---|
| 2011/0282541 | A1* | 11/2011 | Kidokoro ........... | F02D 41/1495 |
| | | | | 701/31.4 |
| 2014/0324307 | A1* | 10/2014 | Akebono ................ | F16D 48/02 |
| | | | | 701/59 |
| 2017/0060102 | A1 | 3/2017 | Sargolzaei et al. | |
| 2019/0332918 | A1* | 10/2019 | Gómez Gutiérrez .. | G06N 3/084 |
| 2019/0346280 | A1* | 11/2019 | Mutschler ............. | G06N 20/00 |
| 2021/0090745 | A1* | 3/2021 | Leavitt ................. | G06F 16/254 |

FOREIGN PATENT DOCUMENTS

| | | | |
|---|---|---|---|
| JP | 04-269988 | A | 9/1992 |
| JP | 05-089077 | A | 4/1993 |
| JP | 06-119003 | A | 4/1994 |
| JP | 09-146645 | A | 6/1997 |
| JP | 2001-126421 | A | 5/2001 |
| JP | 2002-93085 | A | 3/2002 |
| JP | 2006-118429 | A | 5/2006 |

OTHER PUBLICATIONS

Japanese Office Action issued Dec. 3, 2024 in Japanese Patent Application No. 2021-205941, (with English translation), 3 pages.

* cited by examiner

STATE OF CONTROL TARGET
- - - - - OUTPUT OF LEARNING CONTROL

STATE $x_0$ AT START OF LEARNING CONTROL

FIG.6

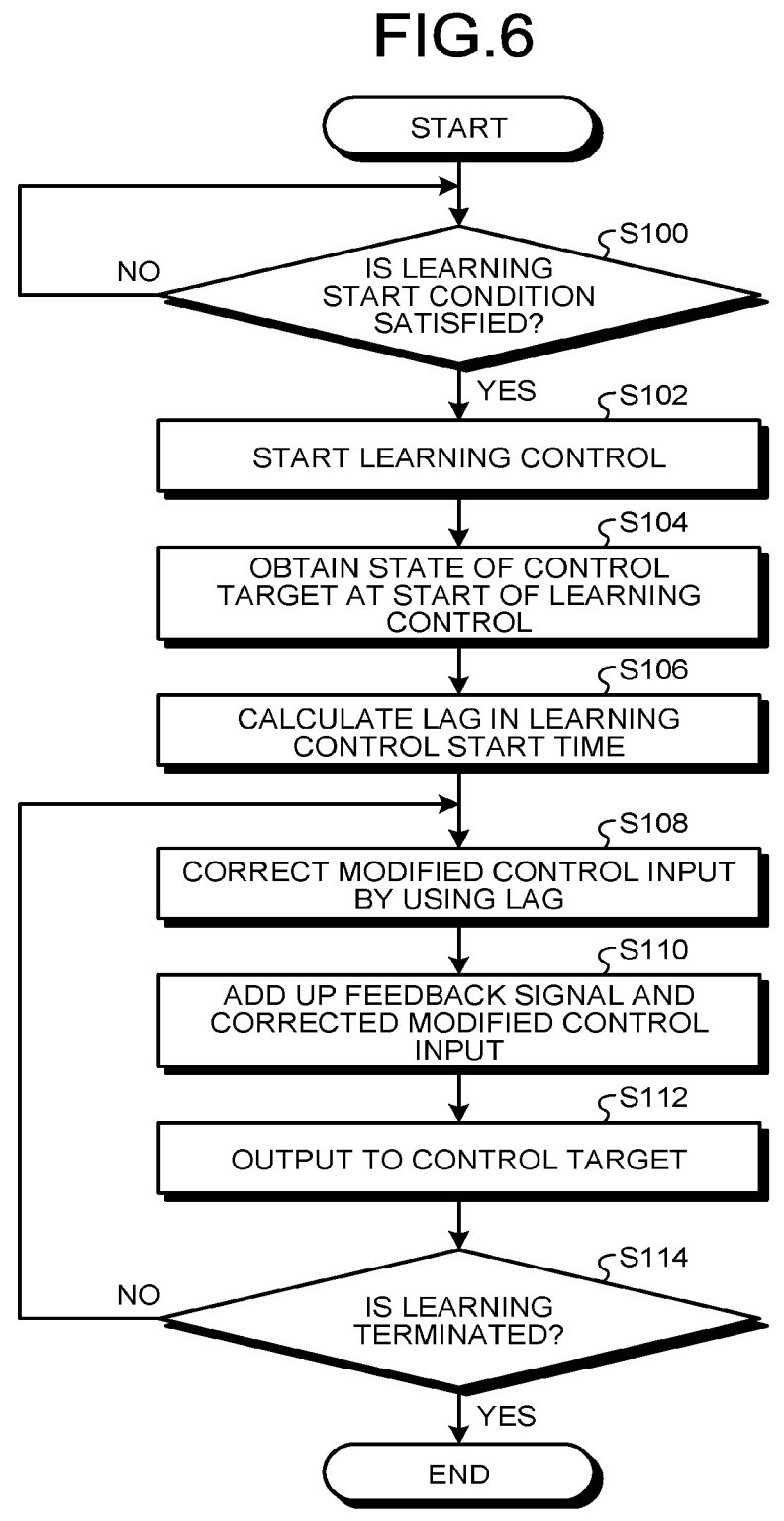

START

S100
IS LEARNING START CONDITION SATISFIED?

NO

YES S102

START LEARNING CONTROL

S104
OBTAIN STATE OF CONTROL TARGET AT START OF LEARNING CONTROL

S106
CALCULATE LAG IN LEARNING CONTROL START TIME

S108
CORRECT MODIFIED CONTROL INPUT BY USING LAG

S110
ADD UP FEEDBACK SIGNAL AND CORRECTED MODIFIED CONTROL INPUT

S112
OUTPUT TO CONTROL TARGET

S114
IS LEARNING TERMINATED?

NO

YES

END

SIMULATION RESULT
OF CONVENTIONAL TECHNOLOGY

SIMULATION RESULT
OF PRESENT EMBODIMENT

SIMULATION RESULT OF PRESENT EMBODIMENT

ACTUAL MACHINE EXPERIMENTAL RESULT
OF CONVENTIONAL TECHNOLOGY

ACTUAL MACHINE EXPERIMENTAL RESULT
OF PRESENT EMBODIMENT

<u>10</u>

LEARNING CONTROL DEVICE, LEARNING CONTROL METHOD, AND COMPUTER PROGRAM PRODUCT

CROSS-REFERENCE TO RELATED APPLICATIONS

This application is based upon and claims the benefit of priority from Japanese Patent Application No. 2021-205941, filed on Dec. 20, 2021; the entire contents of which are incorporated herein by reference.

FIELD

Embodiments described herein relate generally to a learning control device, a learning control method, and a computer program product.

BACKGROUND

As a digital control device, a learning control device has been known that repeatedly controls a control target in accordance with a modified control input, which is a learned value stored in a memory. The learning control device sequentially updates the learned value in the memory from tracking errors between a target value and an output value of the control target to improve control performance with each iteration.

Examples of such a learning control devices include a device performing learning control using a read ahead and a device performing learning control using a zero-phase filter when updating memory.

Generally, learning control is continually performed from the start to the end of operation of the control target. With a longer operation time, a larger memory capacity needs to be provided. Thus, it is conceivable to start learning control when the state of the control target is determined to satisfy a learning start condition, and to start learning control in the middle of the operation of the control target, thereby reducing usage of the memory. However, because the same learning controller is always used in conventional technologies and the operating timing of the learning control device that performs digital control is discrete, a lag is caused in the learning control start time between learning trials. As a result, a lag in the learning control start time may reduce control performance in the conventional technologies.

Considering the above, there is a need to prevent reduction of control performance resulting from a lag in learning control start time.

BRIEF DESCRIPTION I/F THE DRAWINGS

FIG. 1 is a schematic diagram of a learning control device according to an embodiment;

FIG. 6 is a flowchart of information processing;

DETAILED DESCRIPTION

Figure 2A:
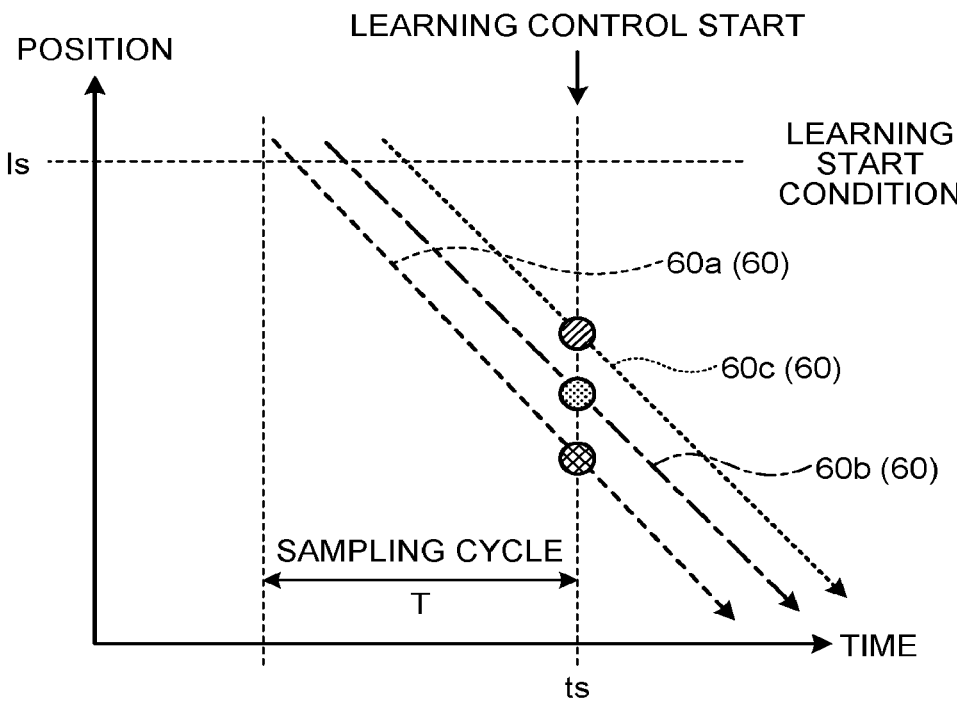
FIG. 2A is an explanatory diagram of learning control.

A learning control device according to an embodiment includes one or more hardware processors. The one or more hardware processors are configured to function as an update unit, a calculation unit, and a correction unit. The update unit serves to update a modified control input in accordance with a tracking error. The modified control input is used during a learning trial. The calculation unit serves to calculate a lag in a learning control start time in accordance with a state of a control target at a start of the learning control. The learning control start time is a time at which learning control starts. The correction unit serves to correct the modified control input having been updated by the update unit. The modified control input being corrected by using the lag to have a value obtained by offsetting the lag.

A learning control device, a learning control method, and a computer program product of the present embodiment will be described in detail below with reference to the accompanying drawings.

Figure 1:
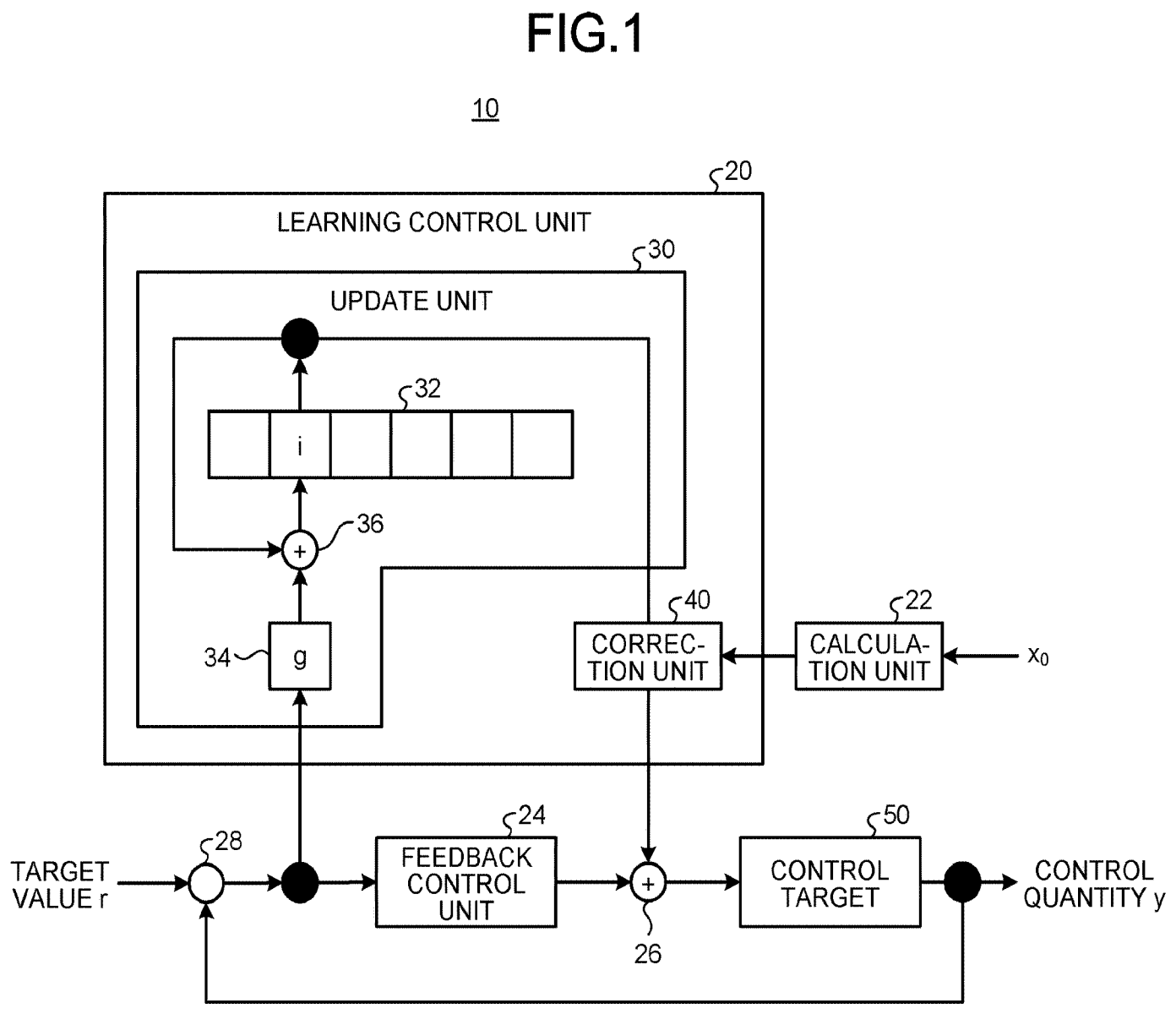

FIG. 1 is a schematic diagram of an example of a learning control device 10 according to the present embodiment.

The learning control device 10 is a digital control device that performs learning control to improve control performance with each iteration by repeatedly controlling a control target 50 and sequentially updating a learned value.

The learning control device 10 performs state control trials at regular intervals, namely, at every predetermined sampling cycle. A learning trial corresponding to a single learning control is completed when the learning control device 10 repeats the state control trials at each sampling cycle. Thus, the single learning trial includes a plurality of state control trials. One iteration of the above-described repetitive control corresponds to one learning trial.

The control target 50 is a target to be controlled by the learning control device 10. The control target 50 is a target of state control by the learning control device 10. The control target 50 is, for example, a disk head driving device for a hard disk drive (HDD), semiconductor manufacturing equipment, a robot, or the like. The state of the control target 50 is, for example, the position on the disk or the position of the robot. The state of the control target 50 is not limited to the position of the target. For example, the state of the control target 50 may be a position, velocity, and acceleration, as well as a combination of two or more of these. In the present embodiment, the state of the control target 50 is described as an example of a mode that represents the position of the control target 50.

The learning control device 10 includes a learning control unit 20, a calculation unit 22, a feedback control unit 24, a first addition unit 26, an error calculation unit 28, and the control target 50.

The control target 50 operates in response to input control signals that are sequentially received from the first addition unit 26 for each state control trial, and sequentially outputs a control quantity y representing a state being a result of the operation. As described above, in the present embodiment, the state of the control target 50 is exemplified by the position of the control target 50. Therefore, in the present embodiment, the control target 50 sequentially outputs the control quantity y representing the position of the control target 50 as a result of its operation in response to the received input control signal. The control quantity y of the control target 50 may be detected by a detector such as a known sensor installed outside the control target 50.

The error calculation unit 28 calculates an error between the control quantity y of the control target 50 and a target value r of the control target 50. The error calculation unit 28 then outputs the error to the learning control unit 20 and the feedback control unit 24. The error calculation unit 28 sequentially receives the control quantity y output from the control target 50 for each state control trial. The error calculation unit 28 calculates the error from the target value r for each control quantity y received, and outputs the error to the learning control unit 20 and the feedback control unit 24.

The feedback control unit 24 generates a feedback signal to cause the state of the control target 50 to track the target value r, by using the error received from the error calculation unit 28. The feedback control unit 24 then outputs the feedback signal to the first addition unit 26.

The first addition unit 26 outputs, to the control target 50, an input control signal obtained by adding up the feedback signal received from the feedback control unit 24 and a modified control input received from the learning control unit 20.

The modified control input refers to a learned value that is learned by the learning control unit 20 for each state control trial.

The learning control unit 20 includes an update unit 30 and a correction unit 40.

The update unit 30 updates the modified control input in accordance with the tracking error. Specifically, the update unit 30 updates the modified control input to be used during the next learning trial in accordance with the tracking error observed during the current learning trial.

Note that, in the present embodiment, the terms "current" and "next" refer to one and the other of two consecutive learning trials in the time series.

In the present embodiment, the current learning trial means the time of the most recent learning trial, and the next learning trial means the time of the learning trial after the current one.

In the present embodiment, the update unit 30 includes a memory 32, a gain multiplication unit 34, and a third addition unit 36.

The memory 32 is used for storing the modified control input for each sampling step i. The sampling step i represents a step of the state control trial performed by the learning control device 10 for each sampling cycle. The modified control input for the sampling step i stored in the memory 32 is the learned value having been updated by the operation of the control target 50 up to the last learning trial.

The gain multiplication unit 34 multiplies the tracking error observed during the current learning trial by a gain g. The tracking error represents the error of the current state of the control target 50 relative to the target state. In the present embodiment, the gain multiplication unit 34 uses, as the tracking error, the error between the target value r and the control quantity y received from the error calculation unit 28. The gain multiplication unit 34 is not limited to the mode of receiving the tracking error from the error calculation unit 28. For example, the gain multiplication unit 34 may obtain the tracking error from another functional unit installed in the learning control device 10 and use the tracking error for multiplication of the gain g.

The third addition unit 36 stores, in the memory 32, a result of adding up the result of multiplying the tracking error observed during the current learning trial by the gain g and the modified control input for the sampling step i stored in the memory 32, as the modified control input for the sampling step i. Thus, the modified control input for the sampling step i stored in the memory 32 is sequentially updated for each learning trial in accordance with the newly observed tracking error.

Note that, in general, learning control is continually performed from the start to the end of operation of a control target.

By contrast, the learning control device 10 of the present embodiment starts learning control when the state of the control target 50 is determined to satisfy the learning start condition for each learning trial. In other words, the learning control device 10 of the present embodiment starts the learning control in the middle of the operation, which is the timing halfway between the start and the end of the operation of the control target 50. By starting the learning control in the middle of the operation of the control target 50, the learning control device 10 of the present embodiment is able to reduce usage of the memory 32.

Figure 2B:
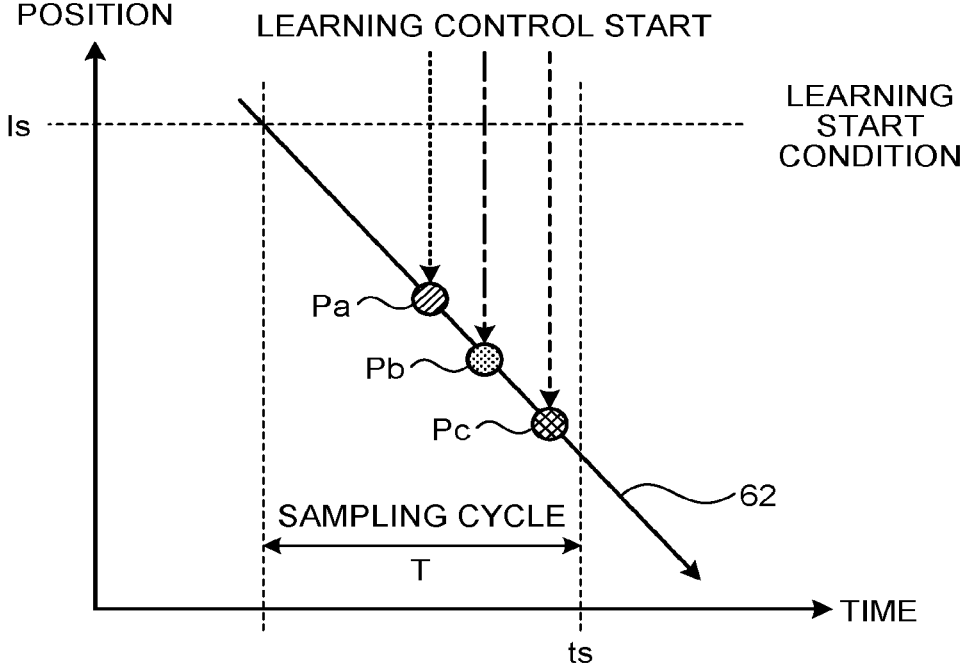
FIG. 2B is an explanatory diagram of the learning control.
Figure 2C:
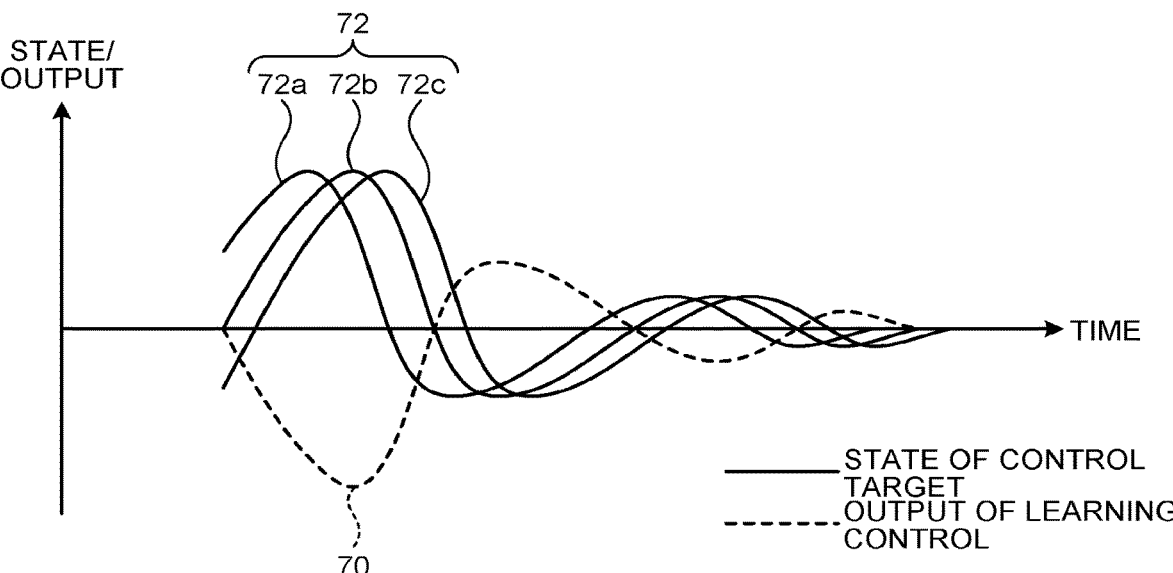
FIG. 2C is an explanatory diagram of the learning control.

FIGS. 2A, 2B, and 2C are explanatory diagrams of examples of learning control.

In FIGS. 2A and 2B, the horizontal axis indicates time and the vertical axis indicates position. The time indicated by the horizontal axis in FIG. 2A is the time elapsed since the control target 50 started its operation. The position indicated by the vertical axis is an example of the state that is a result of the operation of the control target 50. In FIG. 2A, line diagrams 60 (line diagram 60a, line diagram 60b, and line diagram 60c) represent the relation between time and position in repetition of state control trials in each of the three learning trials.

The learning control is performed by repeating state control trials at each sampling cycle T. In the learning control device 10, as illustrated in FIG. 2A, time ts, which is the initial sampling timing after a learning start condition (ls) is satisfied, is identified as the learning control start time. Thus, a lag is caused between the time when the learning start condition is satisfied and the learning control start time (ts) when the learning control actually starts.

FIG. 2B illustrates each of the iterative learning trials represented by the line diagrams 60 (line diagram 60a, line diagram 60b, and line diagram 60c) illustrated in FIG. 2A converted into a line diagram 62 representing the transition of the position of the control target 50 on the assumption that the learning start condition was satisfied at the same time. In FIG. 2B, a plot Pc represents the learning control start time represented by the line diagram 60a, a plot Pb represents the learning control start time represented by the line diagram 60b, and a plot Pa represents the learning control start time represented by the line diagram 60c.

As illustrated in FIG. 2B, in the operation of the control target 50 by repeating the state control trials in each of the iterative learning trials on the assumption that the learning start condition has been satisfied at the same time, a lag is caused in the learning control start time between the iterative learning trials. In other words, because of variations in the overall operation until the learning start condition is satisfied in each of the iterative learning trials, the learning control fails to be started at the same time each time, thereby causing the learning control start time to deviate from the time when the learning start condition has been satisfied by a maximum of one sampling cycle T.

In prior art technologies, however, the same learning controller is used in each of the learning trials, and the same control signals are output to the control target 50 without considering the lag between learning trials.

FIG. 2C is an explanatory diagram of an example of conventional learning control. In FIG. 2C, a line diagram 70 represents the transition of control signals output to the control target 50 for learning control. In FIG. 2C, line diagrams 72 each represent the transition of the state that is the operation of the control target 50 under control according to the control signals represented by the line diagram 70. In FIG. 2C, the transitions of the state of the control target 50 in the three learning trials are represented by a line diagram 72a, a line diagram 72b, and a line diagram 72c.

As illustrated in FIG. 2C, in the conventional technologies, plural types of state transitions differing from each other between learning trials are obtained for the line diagram 70, which is the transition of one type of control signal. In other words, in the conventional technologies, a lag is also caused between the operation of the control target 50 and output of the learning control, thereby the effectiveness of the learning control is reduced. In other words, in the conventional technologies, such a lag in the learning control start time may cause reduction in control performance.

Returning to FIG. 1, the description is continued. The learning control device 10 of the present embodiment includes the calculation unit 22 and the correction unit 40.

The calculation unit 22 calculates a lag in the learning control start time, which is the time at which the learning control starts, in accordance with the state of the control target 50 at the start of the learning control.

The calculation unit 22 obtains the control quantity y of the control target 50 at the start of the learning control as a state $x_0$ of the control target 50 at the learning control start time. As described above, the initial sampling timing after the learning start condition is satisfied is identified as the learning control start time, so that the state $x_0$ of the control target 50 at the learning control start time is inconsistent with the learning start condition.

The calculation unit 22 calculates a lag $\Delta t_0$ in the learning control start time in accordance with the obtained state $x_0$.

The lag $\Delta t_0$ in the learning control start time represents to a lag in the learning control start time between plural learning trials. The lag $\Delta t_0$ in the learning control start time may represent a lag between the time when the learning start condition is satisfied and the learning control start time.

As described above, the learning control start time is deviated from the time when the learning start condition is satisfied, by a maximum of one sampling cycle T. Therefore, in the present embodiment, the calculation unit 22 calculates, as the lag $\Delta t_0$ in the learning control start time, a lag between the learning control start time and a reference timing within the period of the sampling cycle T including the learning control start time. A timing within the period of the sampling cycle T may be optionally predetermined as the reference timing. The reference timing may be, for example, the central timing of the period of the sampling cycle T. In the present embodiment, a case in which the reference timing is the central timing of the period of the sampling cycle T is described as an example.

Figure 3:
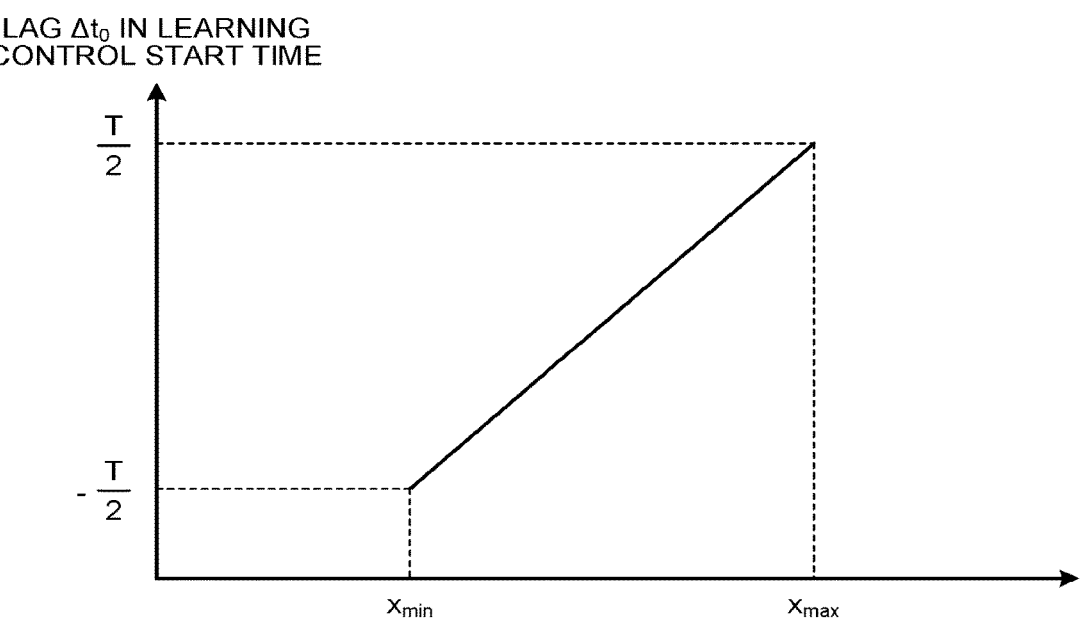
FIG. 3 is an explanatory diagram of calculation of a lag in learning control start time.

FIG. 3 is an explanatory diagram of calculation of the lag $\Delta t_0$ in the learning control start time. The calculation unit 22 calculates the lag $\Delta t_0$ in the learning control start time in accordance with the following equation (1) by using the state $x_0$ of the control target 50 at the start of the learning control to.

$$\Delta t_0 = \frac{x_0 - \frac{x_{max} + x_{min}}{2}}{x_{max} - x_{min}} T \tag{1}$$

In Equation (1), $\Delta t_0$ is the lag $\Delta t_0$ in the learning control start time. T is the sampling cycle T. $x_{max}$ and $x_{min}$ are parameters. $x_{max}$ is the maximum value of the state $x_0$ when the learning control is started such that the lag $\Delta t_0$ is in the range of $-T/2$ through $T/2$, both inclusive in a given learning trial. $x_{min}$ is the minimum value of the state $x_0$ when the learning control is started such that the lag $\Delta t_0$ is in the range of $-T/2$ through $T/2$ both inclusive.

In this case, when the state $x_0$ at the start of the learning control is $x_{max}$, the lag $\Delta t_0$ is calculated as the maximum value $T/2$. When the state $x_0$ at the start of the learning control is $x_{min}$, the lag $\Delta t_0$ is calculated as the minimum value $-T/2$.

Returning to FIG. 1, the description is continued. The calculation unit 22 outputs the calculated lag $\Delta t_0$ in the learning control start time to the correction unit 40. The correction unit 40 stores the lag $\Delta t_0$ in the learning control start time received from the calculation unit 22. The calculation unit 22 calculates the lag $\Delta t_0$ in the learning control start time on the basis of the state $x_0$ of the control target 50 at the start of the learning control for each learning trial, and outputs the lag $\Delta t_0$ to the correction unit 40. Each time the correction unit 40 receives a new lag $\Delta t_0$ in the learning control start time from the calculation unit 22, the correction unit 40 updates the stored lag $\Delta t_0$ in the learning control start time with the newly received lag $\Delta t_0$ in the learning control start time. Thus, for each learning trial, the calculation unit 22 stores the newly calculated lag $\Delta t_0$ in the learning control start time to be used in that learning trial.

The correction unit 40 corrects the modified control input updated by the update unit 30 by using the lag $\Delta t_0$ such that the modified control input has a value obtained by offsetting the lag $\Delta t_0$. In other words, the correction unit 40 corrects the modified control input to be used in the next learning trial, which has been updated by the update unit 30, by using the lag $\Delta t_0$ received from the calculation unit 22.

Figure 4:
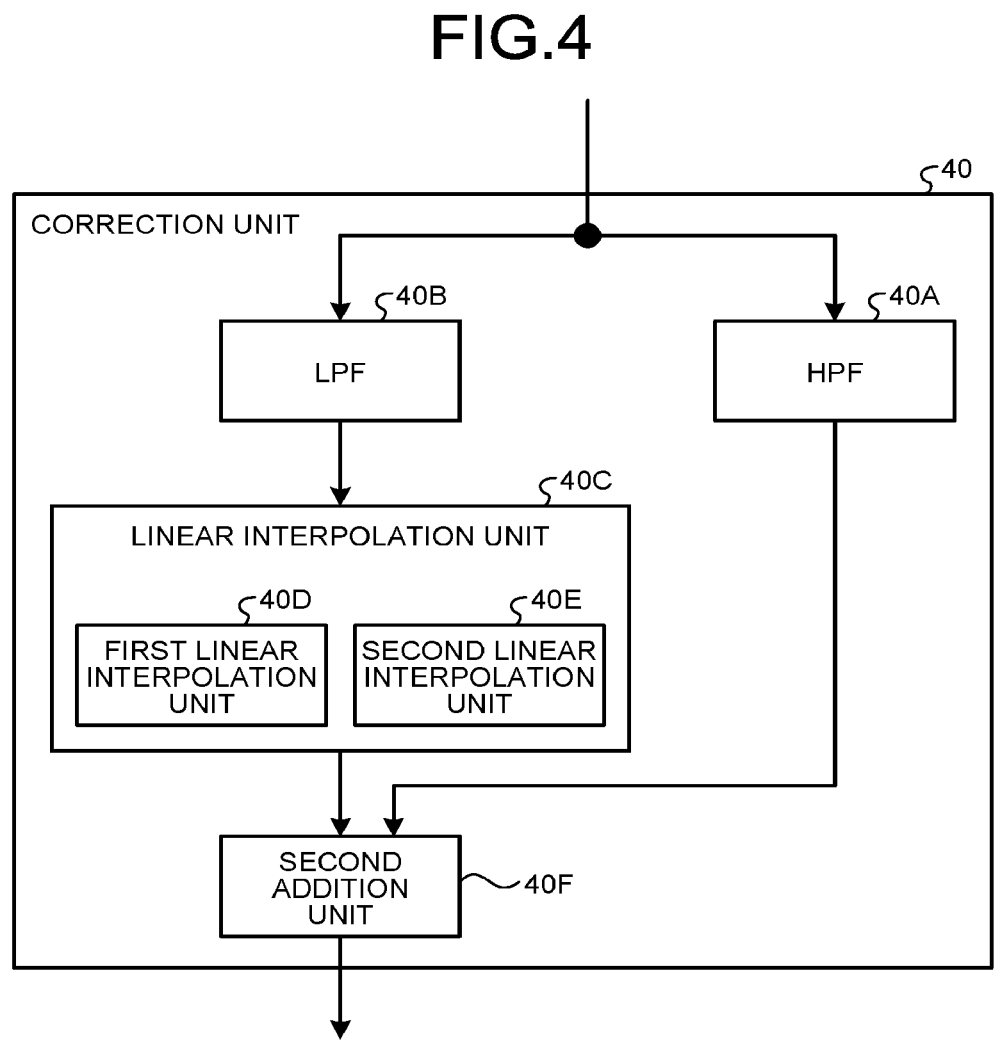
FIG. 4 is a schematic diagram of a configuration of a correction unit.

FIG. 4 is a schematic diagram illustrating an example of a configuration of the correction unit 40.

The correction unit 40 includes a high pass filter (HPF) 40A, a low pass filter (LPF) 40B, a linear interpolation unit 40C, and a second addition unit 40F.

The HPF 40A and the LPF 40B are filters for separating the updated modified control input into high and low frequency components. In other words, the HPF 40A and the LPF 40B are filters for separating the modified control input of the updated sampling step i into high and low frequency components.

The HPF 40A extracts high frequency components included in the modified control input updated by the update unit 30, and outputs the high frequency components to the second addition unit 40F.

The LPF 40B extracts low frequency components included in the modified control input updated by update unit 30, and outputs the low frequency components to the linear interpolation unit 40C.

The linear interpolation unit 40C is a filter that performs linear interpolation for shifting output of the learning control.

Returning to FIG. 1, the description is continued. The output of the learning control refers to output of a signal from the learning control unit 20 to the control target 50 via the first addition unit 26. Thus, the output of the learning control means the modified control input output from the learning control unit 20 to the first addition unit 26 and/or the input control signal output from the first addition unit 26 to the control target 50.

Returning to FIG. 4, the description is continued. The linear interpolation unit 40C is a filter for correcting a value of the modified control input, which is output of the learning control, to a value obtained by offsetting the lag $\Delta t0$ in the learning start time in accordance with a shift of the operation of the control target 50 resulting from the lag $\Delta t_0$ in the learning control start time.

The linear interpolation unit 40C includes a first linear interpolation unit 40D and a second linear interpolation unit 40E.

The first linear interpolation unit 40D is a filter that performs linear interpolation when the lag $\Delta t_0$ is a positive value (plus value). The first linear interpolation unit 40D performs linear interpolation on the modified control input, which is the learned value of the current sampling step i stored in the memory 32, and the modified control input, which is the learned value of the previous sampling step i.

The second linear interpolation unit 40E is a filter that performs linear interpolation when the lag $\Delta t_0$ is a negative value (minus value). The second linear interpolation unit 40E performs linear interpolation on the modified control input, which is the learned value of the current sampling step i stored in the memory 32, and the modified control input, which is the learned value of the next sampling step i.

The filters used when the first linear interpolation unit 40D and the second linear interpolation unit 40E each perform linear interpolation becomes 1 when the lag $\Delta t_0 \to 0$, and becomes $(1+z^{-1})/2$ and $(1+z)/2$ when the lag $\Delta t_0 \to T/2$ and $-T/2$. T is the sampling cycle T. z is a variable in the Z transformation.

The filter used by the first linear interpolation unit 40D for linear interpolation is expressed by Equation (2). The filter used by the second linear interpolation unit 40E for linear interpolation is expressed by Equation (3).

$$\text{When } \Delta t_0 > 0 \text{ holds} \left(1 - \frac{\Delta t_0}{T}\right) + \left(\frac{\Delta t_0}{T}\right)z^{-1} \quad (2)$$

$$\text{When } \Delta t_0 < 0 \text{ holds} \left(1 + \frac{\Delta t_0}{T}\right) + \left(-\frac{\Delta t_0}{T}\right)z \quad (3)$$

Figure 5:
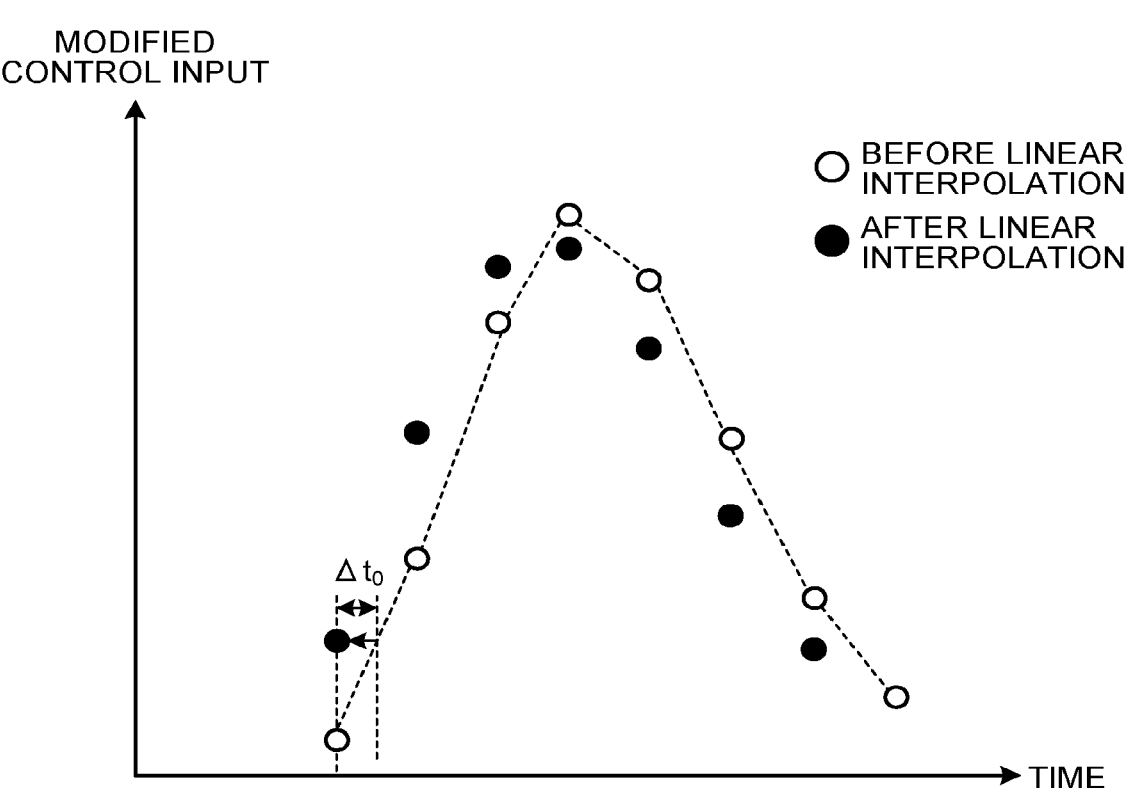
FIG. 5 is a line diagram of a relation between modified control inputs before and after linear interpolation.

FIG. 5 is a line diagram illustrating a relation between the modified control inputs before and after linear interpolation by the linear interpolation unit 40C.

In FIG. 5, the horizontal axis indicates time and the vertical axis indicates the value of the modified control input. In FIG. 5, the plot Pa represents a plot of the modified control input by time before linear interpolation. The plot Pb represents a plot of the modified control input by time after linear interpolation. FIG. 5 illustrates the relation before and after linear interpolation when the lag $\Delta t_0$ in the learning control start time is $-T/2$ of the sampling cycle T.

As illustrated in FIG. 5, the value of the modified control input of sampling step i updated by the update unit 30 is corrected by linear interpolation of the linear interpolation unit 40C. The corrected values are sequentially output to the control target 50 via the first addition unit 26. As a result, the entire output of the learning control is shifted in a simulation manner by the linear interpolation of the linear interpolation unit 40C by ½ step in comparison with a case without performing linear interpolation. In other words, the linear interpolation by the linear interpolation unit 40C corrects the value of the modified control input output from the learning control unit 20 toward the first addition unit 26 for each state control trial such that the value of the modified control input becomes a value obtained at a timing at which the lag $\Delta t_0$ in the learning control start time has been offset.

Note that, if linear interpolation by the linear interpolation unit 40C is performed for all frequency components of the modified control input received from the update unit 30, the gain of the high frequency components will decrease. Considering this issue, the correction unit 40 includes the HPF 40A and the LPF 40B to separate the modified control input of the sampling step i updated by the update unit 30 into high and low frequency components. The linear interpolation unit 40C of the correction unit 40 selectively performs linear interpolation on the output from the LPF 40B, which is a low frequency component, and outputs a result of the linear interpolation to the second addition unit 40F.

Accordingly, the correction unit 40 of the present embodiment is capable of outputting, to the first addition unit 26, the modified control input corrected so as to prevent the gain of the high frequency component in the modified control input from decreasing and to become a value obtained at a timing at which the lag $\Delta t_0$ in the learning control start time has been offset.

Returning to FIG. 1, the description is continued. The first addition unit 26 outputs, to the control target 50, an input control signal obtained by adding up the corrected modified control input received from the correction unit 40 and the feedback signal received from the feedback control unit 24.

Therefore, the control target 50 receives the input control signal with the lag $\Delta t_0$ in the learning control start time offset. This enables the learning control device 10 of the present embodiment to prevent reduction of the control performance of the control target 50 resulting from the lag $\Delta t_0$ in the learning control start time.

An example of the flow of information processing performed by the learning control device 10 of the present embodiment will be described next.

FIG. 6 is a flowchart illustrating the example of the flow of information processing performed by the learning control device 10 of the present embodiment.

When the control target 50 starts its operation, the calculation unit 22 determines whether or not the state of the control target 50 satisfies the learning start condition (step S100). The calculation unit 22 repeats a negative judgment (No at step S100) until a positive judgment (Yes at step S100) is made at step S100. When the positive judgment is made at step S100 (Yes at step S100), the processing proceeds to step S102.

At step S102, the learning control unit 20 starts learning control (step S102).

The calculation unit 22 obtains the state $x_0$ of the control target 50 at the start of the learning control, which is when the learning control has been started at step S102 (step S104). The calculation unit 22 then calculates the lag $\Delta t_0$ in the learning control start time in accordance with the state $x_0$ obtained at step S104 (step S106).

The correction unit 40 corrects, by using the lag $\Delta t_0$ calculated at step S106, the modified control input of the sampling step i that has been updated by the update unit 30 as the learning control has been started (step S108).

The first addition unit 26 adds up the modified control input corrected at step S108 and the feedback signal received from the feedback control unit 24 (step S110), and outputs, to the control target 50, an input control signal obtained by the addition at step S110 (step S112).

The learning control unit 20 judges whether to terminate the learning control (step S114). The learning control unit 20 makes the judgment at step S114 by determining whether a predetermined learning control termination condition is satisfied. When a negative judgment is made at step S114 (No at step S114), the processing returns to step S108 above. When a positive judgment is made at step S114 (Yes at step S114), the routine is terminated.

As described above, the learning control device 10 according to the present embodiment includes the update unit 30, the calculation unit 22, and the correction unit 40. The update unit 30 updates the modified control input to be used during the learning trial in accordance with the tracking error. The calculation unit 22 calculates the lag $\Delta t_0$ in the learning control start time, which is the time at which the learning control starts, in accordance with the state of the control target 50 at the start of the learning control. The correction unit 40 corrects the modified control input updated by the update unit 30 by using the lag $\Delta t_0$ to have a value obtained by offsetting the lag $\Delta t_0$.

In the present embodiment, as described above, the correction unit 40 corrects the modified control input updated by the update unit 30 such that the modified control input has a value obtained by offsetting the lag $\Delta t_0$ in the learning control start time. Thus, the control target 50 receives the input control signal according to the modified control input obtained by offsetting the lag $\Delta t_0$ in the learning control start time.

Therefore, the learning control device 10 of the present embodiment can prevent reduction in the control performance resulting from the lag $\Delta t_0$ in the learning control start time.

Figure 7A:
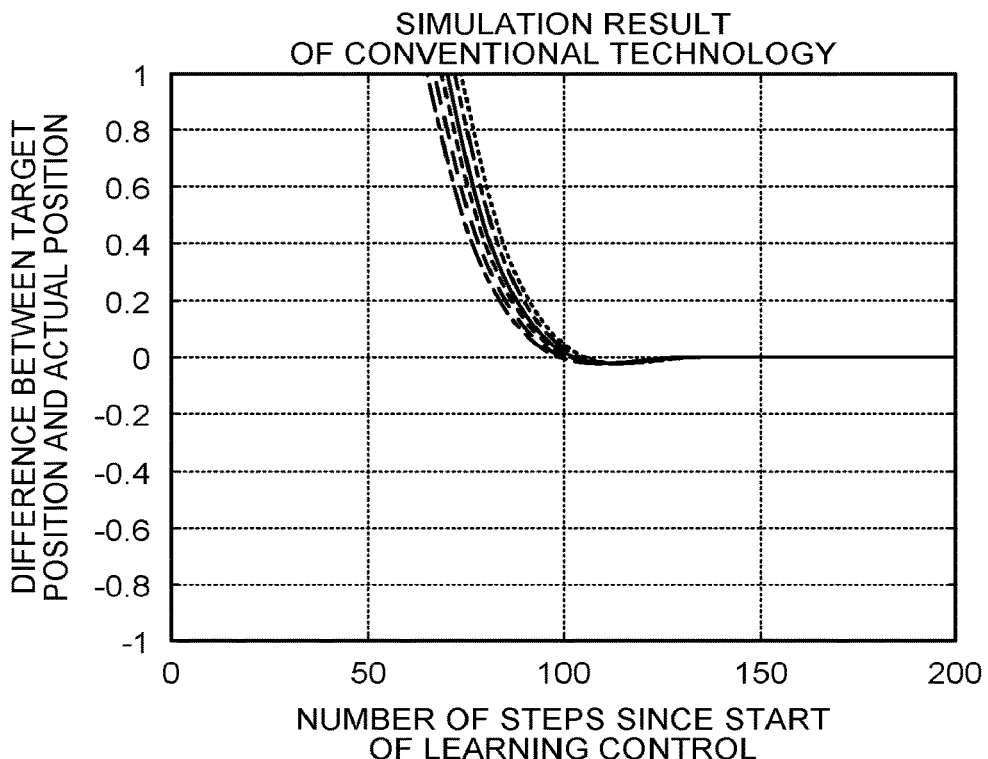
FIG. 7A is a diagram of a simulation result of a comparative learning device.
Figure 7B:
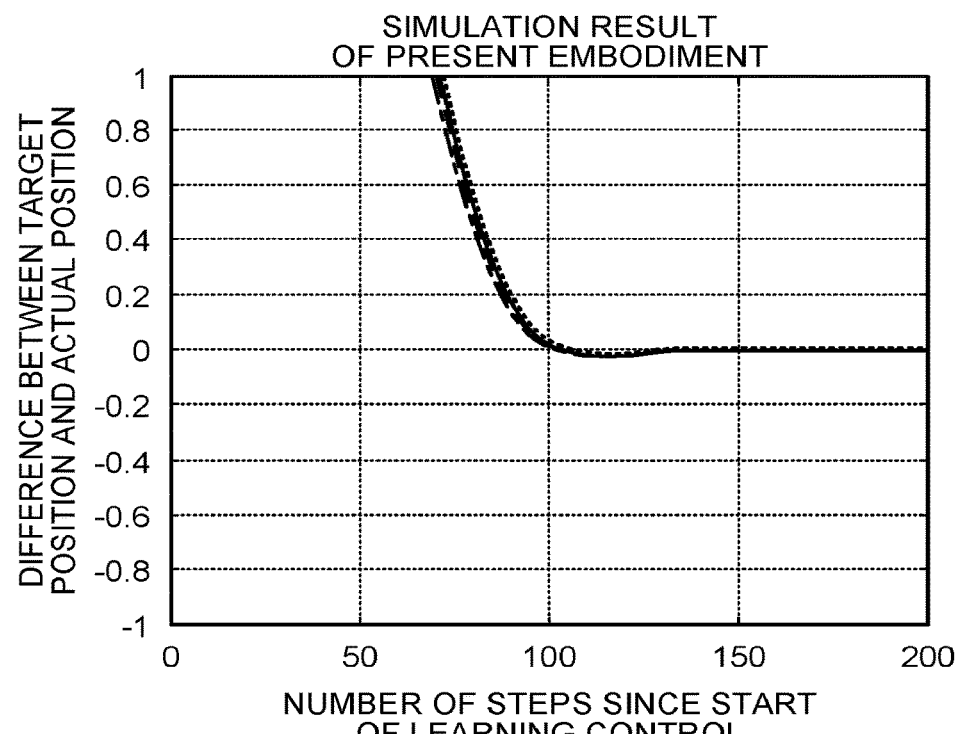
FIG. 7B is a diagram of a simulation result of the learning control device according to the embodiment.
Figure 8:
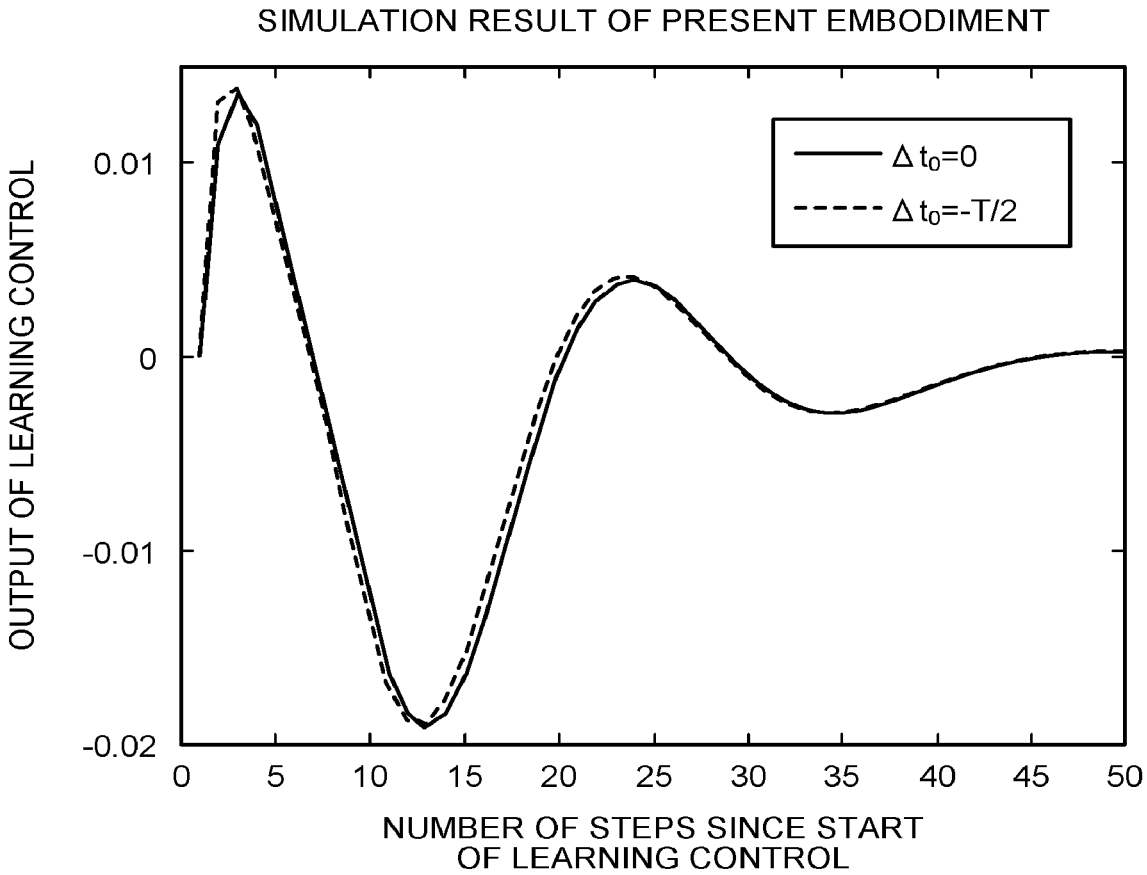
FIG. 8 is a diagram of a simulation result of the learning control device according to the embodiment.

FIG. 7A through FIG. 8 are explanatory diagrams of effects of the learning control device 10 according to the present embodiment. A comparative learning control device, which is a conventional learning control device used in the description as to FIG. 7A through FIG. 8, has the same configuration as the learning control device 10 of the present embodiment illustrated in FIG. 1, except that the comparative learning control device does not include the correction unit 40 and the calculation unit 22.

In the description of FIG. 7A through FIG. 8, a filter expressed by Equation (4) below is applied to the filter of the HPF 40A in the learning control device 10 of the present embodiment, and a filter expressed by Equation (5) below is applied to the filter of the LPF 40B.

$$(1-z^{-1})/2 \tag{4}$$

$$(1+z^{-1})/2 \tag{5}$$

FIGS. 7A and 7B illustrate simulation results of the difference between the target position and the actual position of the control target 50 when the control target 50 operates toward the target position. FIG. 7A is a diagram illustrating a simulation result for a case in which the comparative learning device is used. FIG. 7B is a diagram illustrating a simulation result for a case in which the learning control device 10 of the present embodiment is used. FIGS. 7A and 7B illustrate the results after sufficient learning, and the results of a learning trial made up of plural times of state control trials are overlaid.

In FIG. 7A, which represents the simulation result of the conventional comparative learning device, the entire waveforms vary due to the timing lag in the start of the learning control. On the other hand, in FIG. 7B, which represents the simulation result of the learning control device 10 of the present embodiment, it is confirmed that the variation is prevented, and that reduction of the control performance resulting from the lag in the learning control start time is prevented.

FIG. 8 is a diagram illustrating a change in output from the correction unit 40 in the learning control device 10 of the present embodiment. FIG. 8 illustrates cases in which the lag $\Delta t_0$ in the learning control start time is approximately zero and $-T/2$. Thus, it can be confirmed that the output of the learning control is also corrected in accordance with the lag $\Delta t_0$ in the learning control start time in the learning control device 10 of the present embodiment.

Figure 9A:
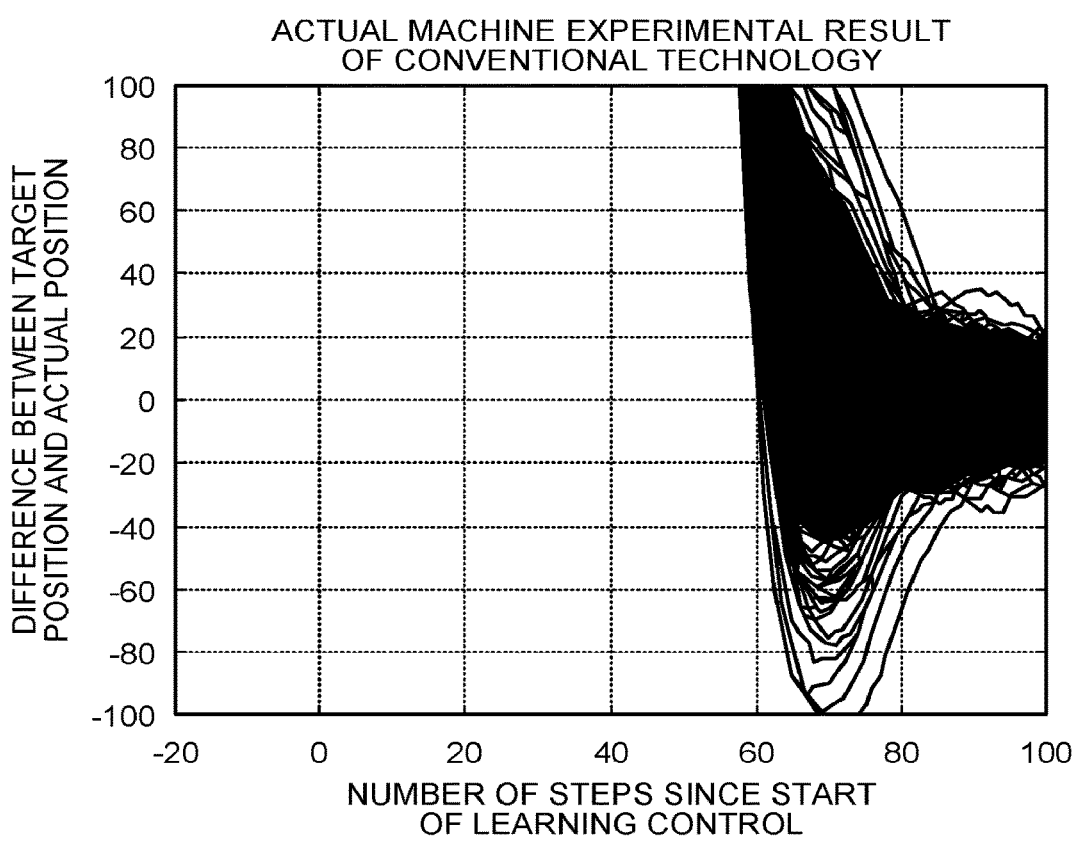
FIG. 9A is a diagram of a result of actual machine experiment with the comparative learning device.
Figure 9B:
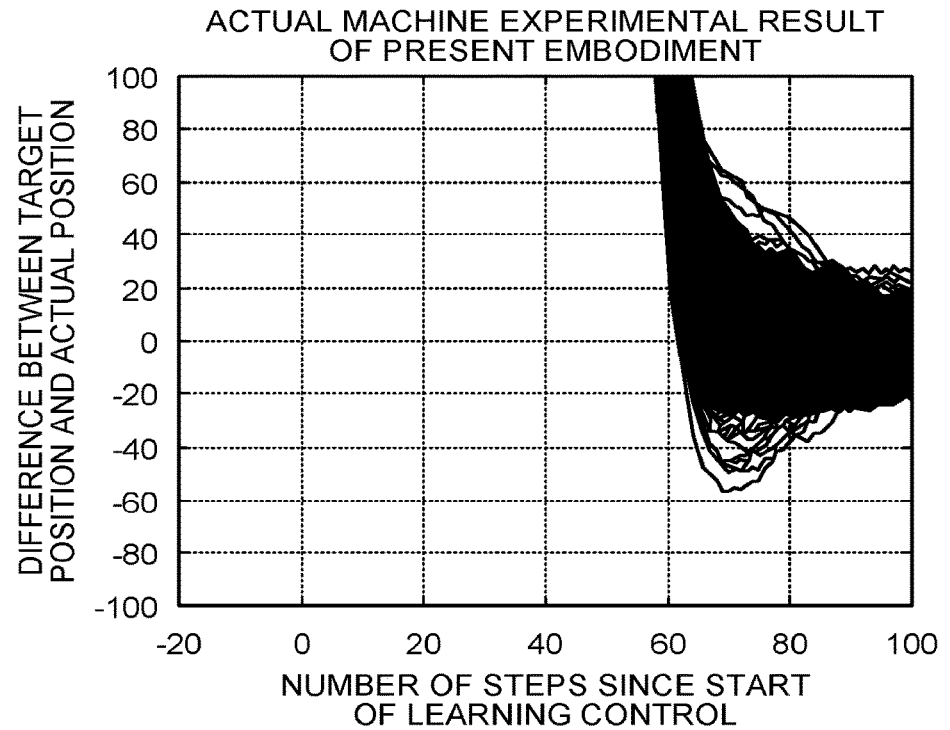
FIG. 9B is a diagram of an actual machine experimental result of the learning control device according to the embodiment.

FIGS. 9A and 9B are explanatory diagrams of the effect of the learning control device 10 according to the present embodiment through experiments on actual devices. A comparative learning control device, which is a conventional learning control device and used in the description as to FIG. 9A and FIG. 9B, has the same configuration as the learning control device 10 of the present embodiment illustrated in FIG. 1, except that the comparative learning control device does not include the correction unit 40 and the calculation unit 22.

In the description as to FIG. 9A and FIG. 9B, a filter expressed by Equation (6) below is applied to the filter of the HPF 40A in the learning control device 10 of the present embodiment, and a filter expressed by Equation (7) below is applied to the filter of the LPF 40B.

$$(1-z^{-1})/2 \tag{6}$$

$$(1+z^{-1})/2 \tag{7}$$

FIGS. 9A and 9B illustrate actual machine experimental results of the difference between the target position and the actual position of the control target 50 when the control target 50 operates toward the target position. FIG. 9A illustrates the actual machine experimental result for a case in which the comparative learning device is used. FIG. 9B illustrates the actual machine experimental result for a case in which the learning control device 10 of the present embodiment is used. FIGS. 9A and 9B illustrate the results after sufficient learning, and the results of a learning trial made up of plural times of state control trials are overlaid.

Similarly to FIGS. 7A and 7B indicating the simulation results, in FIG. 9A indicating an actual machine experimental result of the conventional comparative learning device, the entire waveforms vary due to the timing lag in the start of the learning control. On the other hand, in FIG. 9B indicating the actual machine experimental result of the learning control device 10 of the present embodiment, it is confirmed that the variation is prevented, and that reduction of the control performance resulting from the lag in the learning control start time is prevented.

From the above simulation results and the actual machine experimental results, it is also confirmed that the learning control device 10 of the present embodiment prevents the reduction of the control performance resulting from the lag $\Delta t_0$ in the learning control start time.

Next, an example of a hardware configuration of the learning control device 10 according to the present embodiment will be described.

Figure 10:
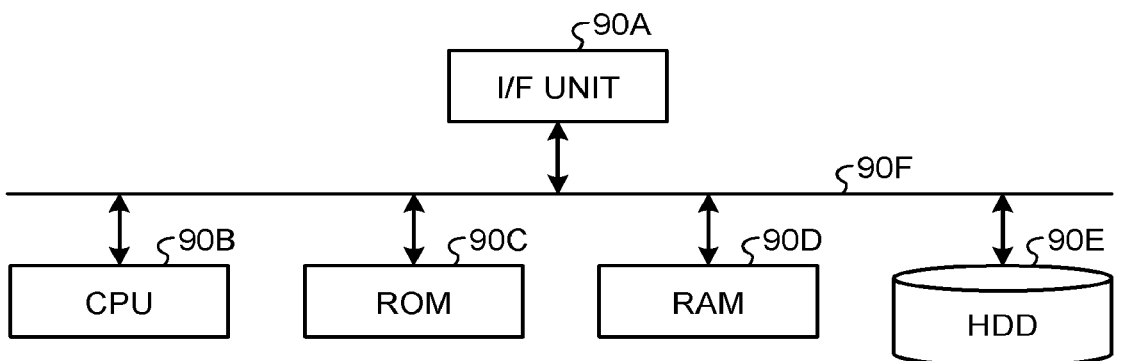
FIG. 10 is a hardware configuration diagram.

FIG. 10 is a hardware configuration diagram of the example of the learning control device 10 according to the present embodiment.

The learning control device 10 of the present embodiment includes a control unit such as a central processing unit 11 12

(CPU) 90B, a memory device such as read-only memory (ROM) 90C, random-access memory (RAM) 90D, and a hard disk drive (HDD) 90E, an I/F unit 90A that interfaces with various devices, and a bus 90F that connects the units, and has a hardware configuration that uses an ordinary computer.

In the learning control device 10 of the present embodiment, the CPU 90B reads and executes a computer program from the ROM 90C onto the RAM 90D, thereby realizing each of the above units on the computer.

The computer program for executing the above processes performed by the learning control device 10 of the present embodiment may be stored in the HDD 90E. The computer program for executing the above processes performed by the learning control device 10 of the present embodiment may be pre-embedded in the ROM 90C and provided.

The computer program for executing the above processes performed by the learning control device 10 of the present embodiment may be stored in a computer-readable storage medium, such as a CD-ROM, CD-R, memory card, digital versatile disc (DVD), or flexible disk (FD), in an installable or executable format file, and provided as a computer program product. The computer program for executing the above processes performed by the learning control device 10 of the present embodiment may be stored on a computer connected to a network such as the Internet, and provided by having the computer program downloaded via the network. The computer program for executing the above processes performed by the learning control device 10 of the present embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning control device, comprising:
   processing circuitry including one or more hardware processors and configured to:
      update a modified control input in accordance with a tracking error, the modified control input being used during a learning trial;
      calculate, in accordance with a state of a control target at a start of a learning control, a lag between a time when the state of the control target satisfies a learning start condition and a learning control start time when the learning control actually starts;

correct the modified control input having been updated, the modified control input being corrected by using the lag to have a value obtained by offsetting the lag; and
   control the control target based on the modified control input.

2. The learning control device according to claim 1, wherein the processing circuitry is further configured to:
   extract, using a low-pass filter, a low frequency component included in the updated modified control input;
   extract, using a high-pass filter, a high frequency component included in the updated modified control input;
   perform linear interpolation on an output of the low-pass filter by using the lag; and
   output a result of adding up an output of the high-pass filter and an output of the linear interpolation as a corrected modified control input.

3. The learning control device according to claim 1, the processing circuitry is further configured to output, to the control target, an input control signal obtained by adding up a feedback signal to cause the state of the control target to track a target value and the modified control input having been corrected by the processing circuitry.

4. A learning control method, comprising:
   updating a modified control input in accordance with a tracking error, the modified control input being used during a learning trial;
   calculating, in accordance with a state of a control target at a start of a learning control, a lag between a time when the state of the control target satisfies a learning start condition and a learning control start time when the learning control actually starts;
   correcting the modified control input having been updated, the modified control input being corrected by using the lag to have a value obtained by offsetting the lag; and
   controlling the control target based on the modified control input.

5. A computer program product comprising a non-transitory computer-readable recording medium on which a program executable by a computer is recorded, the program instructing the computer to:
   update a modified control input in accordance with a tracking error, the modified control input being used during a learning trial;
   calculate, in accordance with a state of a control target at a start of the learning control, a lag between a time when the state of the control target satisfies a learning start condition and a learning control start time when the learning control actually starts;
   correct the modified control input having been updated, the modified control input being corrected by using the lag to have a value obtained by offsetting the lag; and
   control the control target based on the modified control input.

* * * * *